(12) United States Patent
Heitzmann et al.

(10) Patent No.: US 7,703,792 B1
(45) Date of Patent: Apr. 27, 2010

(54) ROTATIONAL TRAILER HITCH COUPLING ASSEMBLY

(75) Inventors: David E. Heitzmann, Union, MI (US); Jonathan D. Kauffman, Elkhart, IN (US)

(73) Assignee: MOR/ryde International, Inc., Elkhart, IN (US)

( * ) Notice: Subject to any disclaimer, the term of this patent is extended or adjusted under 35 U.S.C. 154(b) by 187 days.

(21) Appl. No.: 11/946,477

(22) Filed: Nov. 28, 2007

Related U.S. Application Data

(60) Provisional application No. 60/867,534, filed on Nov. 28, 2006.

(51) Int. Cl.
*B60D 1/32* (2006.01)

(52) U.S. Cl. .................. 280/455.1; 280/432; 280/441.2; 280/417.1

(58) Field of Classification Search ................. 280/433, 280/439, 455.1, 432, 441.2, 417.1
See application file for complete search history.

(56) References Cited

U.S. PATENT DOCUMENTS

| | | | |
|---|---|---|---|
| 2,038,975 A | 4/1936 | Willetts | |
| 2,166,308 A * | 7/1939 | Logan | 280/432 |
| 2,351,151 A | 6/1944 | Sattler | |
| 2,761,699 A | 9/1956 | Martin | |
| 3,059,795 A | 10/1962 | Schroeder | |
| 3,633,941 A | 1/1972 | Pleier | |
| 3,747,942 A | 7/1973 | Hammond | |
| 3,810,661 A * | 5/1974 | Lowrance | 280/417.1 |
| 3,820,821 A | 6/1974 | Leland | |
| 3,823,961 A | 7/1974 | Korodi | |
| 3,861,716 A | 1/1975 | Baxter et al. | |
| 3,893,712 A | 7/1975 | Sallier | |
| 3,897,086 A | 7/1975 | Breford | |
| 3,972,542 A | 8/1976 | Dirks et al. | |
| 4,068,860 A | 1/1978 | Meyers et al. | |
| 4,861,060 A | 8/1989 | Schult et al. | |
| 4,955,631 A | 9/1990 | Meyer | |
| 5,071,152 A | 12/1991 | Ducote | |
| 5,135,248 A | 8/1992 | Keiserman | |
| 5,385,363 A * | 1/1995 | Morey | 280/511 |

(Continued)

FOREIGN PATENT DOCUMENTS

DE 2529262 1/1977

(Continued)

OTHER PUBLICATIONS

Web page illustration and information for Signature SeriesTM and Professional & Select SeriesTM Sliders; Reese-Hitches.com; date unkwn.

*Primary Examiner*—Lesley Morris
*Assistant Examiner*—Maurice Williams
(74) *Attorney, Agent, or Firm*—Botkin & Hall, LLP

(57) ABSTRACT

A hitch coupling assembly attaching a trailer to a towing vehicle. The towing vehicle including a hitch plate that has an upper surface and an open end for receiving a king pin. The coupling assembly has an arm with opposite ends. A skid plate is attached to one end of the arm and the skid plate has a perimeter defined by sides. The king pin extends from a surface of the skid plate. A journal pin is attached to the opposite end of the arm and is rotatable relative to the arm. The journal pin is optionally lockable or the arm relative to the hitch is optionally lockable.

10 Claims, 13 Drawing Sheets

U.S. PATENT DOCUMENTS

| | | | |
|---|---|---|---|
| 5,890,728 A * | 4/1999 | Zilm | 280/433 |
| 6,065,766 A | 5/2000 | Pulliam | |
| 6,308,977 B1 | 10/2001 | Pulliam et al. | |
| 6,398,250 B1 * | 6/2002 | Hashman | 280/438.1 |
| 6,834,879 B1 | 12/2004 | Lorman | |
| 2004/0070171 A1 * | 4/2004 | Freeman | 280/441.2 |
| 2005/0082787 A1 * | 4/2005 | Dick | 280/415.1 |

FOREIGN PATENT DOCUMENTS

| | | |
|---|---|---|
| GB | 827185 | 2/1960 |
| SU | 880848 | 11/1981 |

\* cited by examiner

SECTION B-B

SECTION A-A

ROTATIONAL TRAILER HITCH COUPLING ASSEMBLY

CROSS REFERENCE TO RELATED APPLICATIONS

This application claims the benefit of U.S. Provisional Application No. 60/867,534, filed Nov. 28, 2006, the disclosure of which is hereby incorporated by reference.

BACKGROUND OF THE INVENTION

1. Field of the Invention

The present invention relates to a trailer hitch coupling assembly, and more particularly, to a pin box assembly using a combination pin box and extension assembly with locking features to facilitate a change in the axis of rotation of a fifth wheel trailer when attached to a towing vehicle.

2. Description of the Background of the Invention

Fifth wheel trailers have customarily been adapted with a coupling apparatus which facilitates attachment to a towing vehicle. Typically, a standard fifth wheel hitch is mounted on the towing vehicle, where a standard pin box on the fifth wheel trailer is adapted with a king pin to fit the hitch and properly support the weight of the trailer.

The towing vehicle, equipped with the hitch, and with the trailer secured, can then be driven supporting the trailer, which rotates securely around an axis created by the interconnect between the trailer king pin and the adaptive mount on the hitch.

Numerous advancements in the art have been shown. For example, as disclosed in U.S. Pat. No. 6,986,524, a fifth wheel pin box assembly with a rubber shear spring to accomplish appreciable cushioned movement in the connection between the towing vehicle and the trailer.

Another example includes an extension coupling for use with trailers, as described in U.S. Pat. No. 5,890,728, in which a retainer assembly engages the trailer hitch to resist rotation around the king pin axis and force rotation of the trailer back to a separate axis. This coupling was developed to accommodate use on only short-bed towing vehicles where a more forward axis of rotation of the trailer could cause impact between the trailer and the cab of the towing vehicle. Additionally, by design, this coupling introduces uneven stress on a trailer hitch in its engagement when turning maneuvers are instituted.

Many consumers of fifth wheel trailers may own different towing vehicles, including those of the short-bed and long-bed varieties. It would be desirable to have a hitch coupling assembly available for use with a variety of towing vehicles, in which the axis of rotation is easily moved forward or backward based on towing-vehicle bed length through use of a locking mechanism.

SUMMARY OF THE INVENTION

It is an object of the present invention to provide an improved hitch coupling assembly used to couple a trailer and its towing vehicle.

It is another object of the present invention to provide a hitch coupling assembly that can be used for both short-bed and long-bed towing vehicles.

Another object of the present invention is to provide a hitch coupling assembly for changing the axis of rotation of a fifth wheel trailer around a towing vehicle by providing a removable locking mechanism and an additional pin for a separate rotational axis.

According to one aspect of the present invention, there is provided a hitch coupling assembly including a pin box and an attached arm. The pin box includes a pin passing therethrough with attached brackets for connection to a trailer chassis. The arm includes a skid pad assembly to which a pin is attached for connection to a trailer hitch. A lock-out stop is included which allows for rotation of the hitch coupling assembly to be alternately moved from an axis around the pin attached to the skid pad assembly to an axis around the pin inside the pin box.

According to another aspect of the present invention, there is also provided a hitch coupling assembly including a pin box and an attached arm. The pin box includes a pin passing therethrough with attached brackets for connection to a trailer chassis. The arm includes a skid pad assembly to which a pin is attached for connection to a trailer hitch. A set of lock-out stops is included which allows for rotation of the hitch coupling assembly to be alternately moved from an axis around the pin attached to the skid pad assembly to an axis around the pin inside the pin box.

In another aspect, the present invention provides a hitch coupling assembly including a pin box and an attached arm. The pin box includes a pin passing therethrough with attached brackets for connection to a trailer chassis. The arm includes a skid pad assembly to which a pin is attached for connection to a trailer hitch. A lock-out stop and a hitch plate lock-out stop are included which allow for rotation of the hitch coupling assembly to be alternately moved from an axis around the pin attached to the skid pad assembly to an axis around the pin inside the pin box.

The present invention in another aspect also provides a hitch coupling assembly including an integrated arm. The integrated arm includes a pin passing therethrough with attached brackets for connection to a trailer chassis. The integrated arm also includes a skid pad assembly to which a pin is attached for connection to a trailer hitch. A lock-out stop and a hitch plate lock-out stop are included which allow for rotation of the hitch coupling assembly to be alternately moved from an axis around the pin attached to the skid pad assembly to an axis around the pin inside the integrated arm. A collar is provided which allows for multiple vertical positions of the hitch coupling assembly.

In another aspect, the present invention provides a hitch coupling assembly including an integrated arm. The integrated arm includes a pin passing therethrough with attached brackets for connection to a trailer chassis. The integrated arm includes an attached pin for connection to a trailer hitch. A lock-out stop and a hitch plate lock-out stop are included which allow for rotation of the hitch coupling assembly to be alternately moved from an axis around the pin attached to the skid pad assembly to an axis around the pin inside the integrated arm. A collar is provided which allows for multiple vertical positions of the hitch coupling assembly.

The various objects, features and advantages of the present invention will become more readily apparent from a consideration of the following description of the illustrative embodiments thereof, when read in conjunction with the accompanying drawings, in which like reference numerals represent the same or similar items.

DETAILED DESCRIPTION OF INVENTION

Figure 1A:
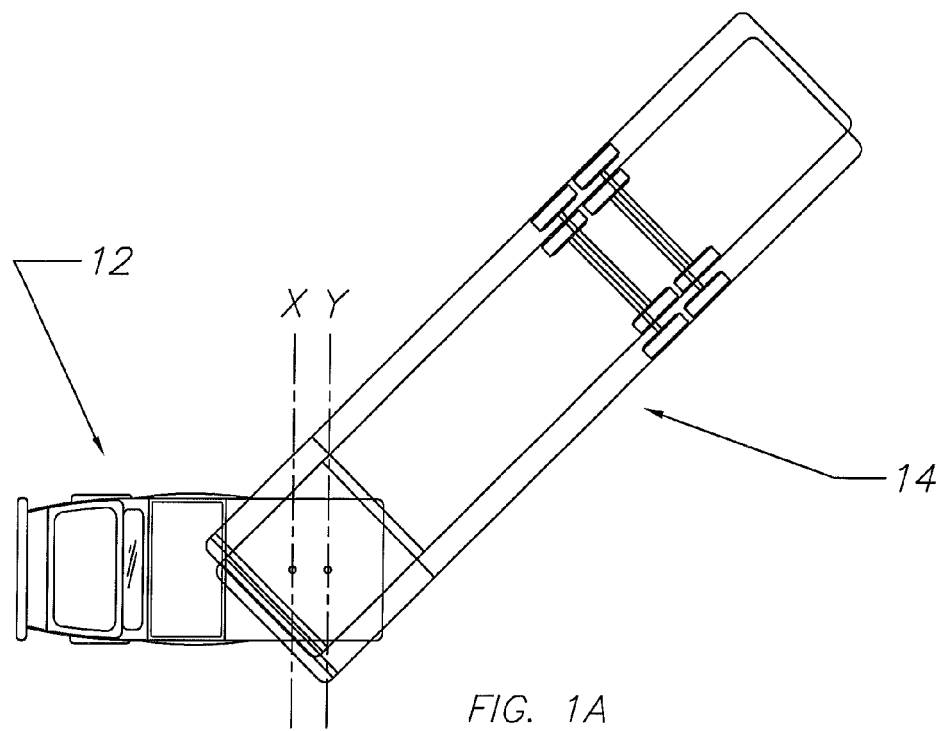
FIG. 1A is a top plan view of a towing vehicle and a fifth-wheel travel trailer combination.
Figure 1B:
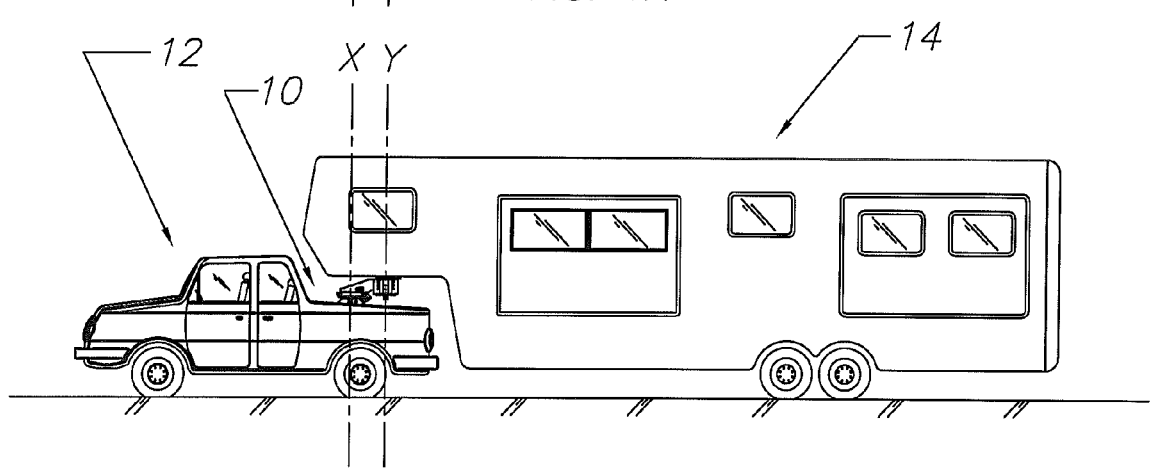
FIG. 1B is a side elevational view of the towing vehicle and fifth-wheel travel trailer combination showing use of an embodiment of a rotational pin box assembly according to the present invention.

A hitch coupling assembly 10 that is useful for connecting a trailer 14 to a towing vehicle 12 according to the present invention is described with reference to FIGS. 1A and 1B, in which both figures show a trailer axis of rotation X, such as is common for traditional hitch coupling assemblies, and an axis of rotation Y, which is achieved through use of the hitch coupling assemblies further developed below.

Figure 2:
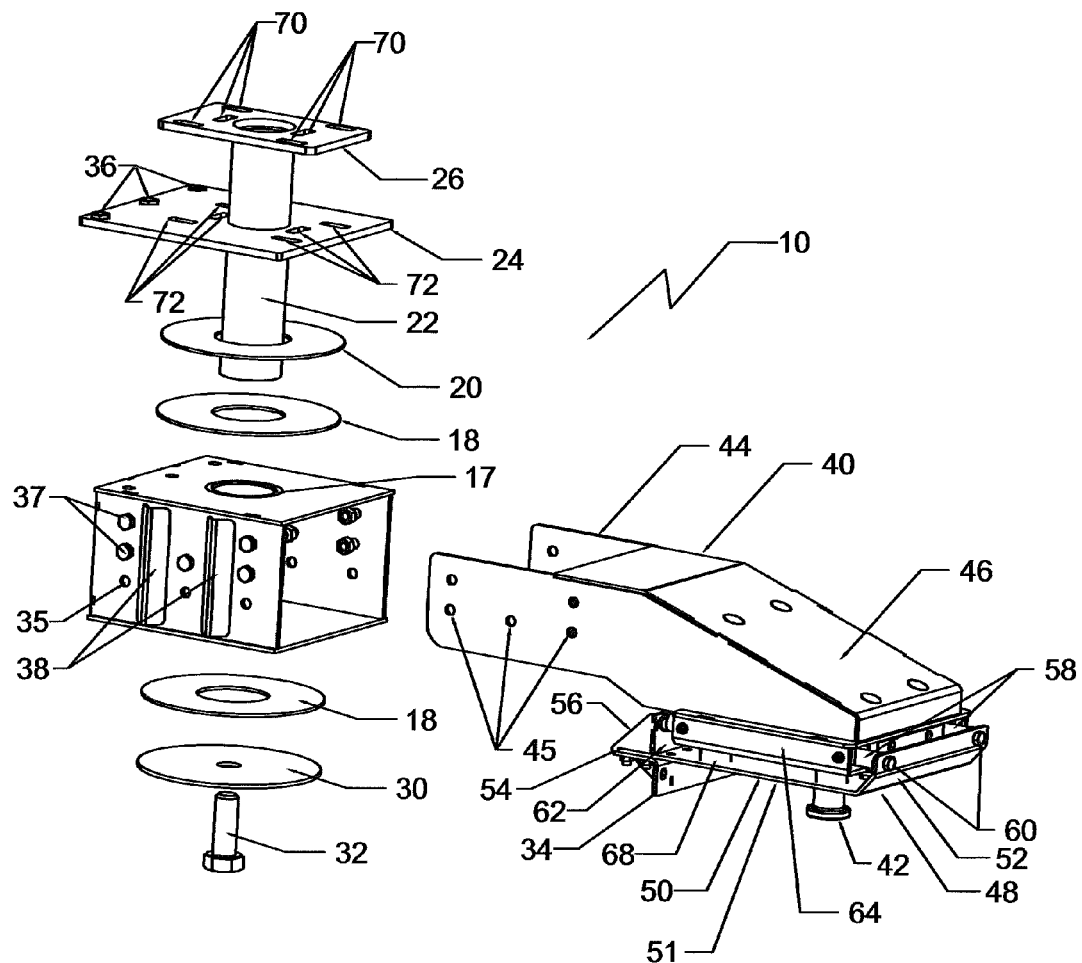
FIG. 2 is an exploded perspective view of an embodiment of the rotational pin box assembly.

In FIGS. 2-9, one embodiment 10 of a hitch coupling assembly is shown. As shown in FIG. 2, this embodiment includes, generally, a pin box 16 for securement to an arm 40. The pin box encloses a journal pin 22 which passes therethrough around an opening lined with top and bottom bearings 17. The bearings 17 are preferably fiberglass and Teflon-lined, but may be made of other material designed to allow the pin box 16 to rotate about the journal pin 22. Secured around the top end of the journal pin 22, preferably through a weld, are brackets 24 and 26. A plurality of apertures 70 shown on bracket 26 and apertures 72 shown on bracket 24 allow for connection of the brackets 24, 26 to the inner chassis of a fifth wheel trailer 14. A set of upper washers 18, 20 are secured around the journal pin 22 between the top of the pin box 16 and the bottom of the bracket 24. The first upper washer 18 is preferably made of plastic and used to provide cushioning and ease the rotation of the pin box 16 about the journal pin 22. The second upper washer 20 is preferably made of metal. A lower set of washers 18, 30 are secured around the journal pin 22 between the bottom of the pin box 16 and a lower bolt 32. The washers 18 are preferably made of plastic and used to provide cushioning and ease the rotation of the pin box 16 about the journal pin 22. The washer 30 is preferably made of metal. The lower bolt 32 is threaded into a threaded hole located on the bottom of the journal pin 22, which then secures the above-described components together. It is preferable to include sidewall reinforcements 38 on the pin box 16 to meet current industry ratings standards for strength and rigidity.

The arm 40 includes on a distal end 46, on which is attached a skid pad assembly 48, described generally in U.S. Pat. No. 6,986,524, and incorporated herein by reference, for mounting the hitch coupling assembly 10 to a trailer hitch 74. The skid pad assembly 48 includes a skid pad 50 having sides 51. A back end portion 62 supports a rubber shear spring 66 and accompanying bolts 60 that restrain shafts 58 and channel members 68. A king pin 42 may be secured to the skid pad 50 by welding and is of a standard conventional construction known in the art. As is well-known, the king pin 42 has a reduced section which receives lever-operated jaws in the receiving mechanism on the towing vehicle to lock the king pin 42 therein. The straight end 54 contains holes for removably securing lock-out stop 34 to the bottom of skid pad 50. In operation, lock-out stop 34 will rest against a trailer hitch plate 76 and prevent movement of the king pin 42 within the hitch plate 76.

A plurality of holes 45 on the arm 40 are aligned with a plurality of holes 35 on the pin box 16, and the arm 40 is secured to the pin box 16 with a plurality of fasteners 37 passing through holes 35 and 45. As shown in FIGS. 2-7, the arm 40 is shown at its upmost position secured to the pin box 16. As all fifth wheel trailers do not maintain an exact height in relation to a towing vehicle hitch, additional holes 35 are provided to be able to secure the arm 40 in at least two positions within the pin box 16. It can be appreciated that the pin box 16 may be designed with additional vertical adjustments to allow for additional rows of holes 35 for different vertical positions of the arm 40.

As shown in FIGS. 3-7, the lock-out stop 34 may be moved from its position on the bottom of skid pad 50 to a position on the bottom and back of the bracket 24 which extends laterally beyond the pin box 16, being secured by fasteners 33 and attached nuts 36.

Figure 3:
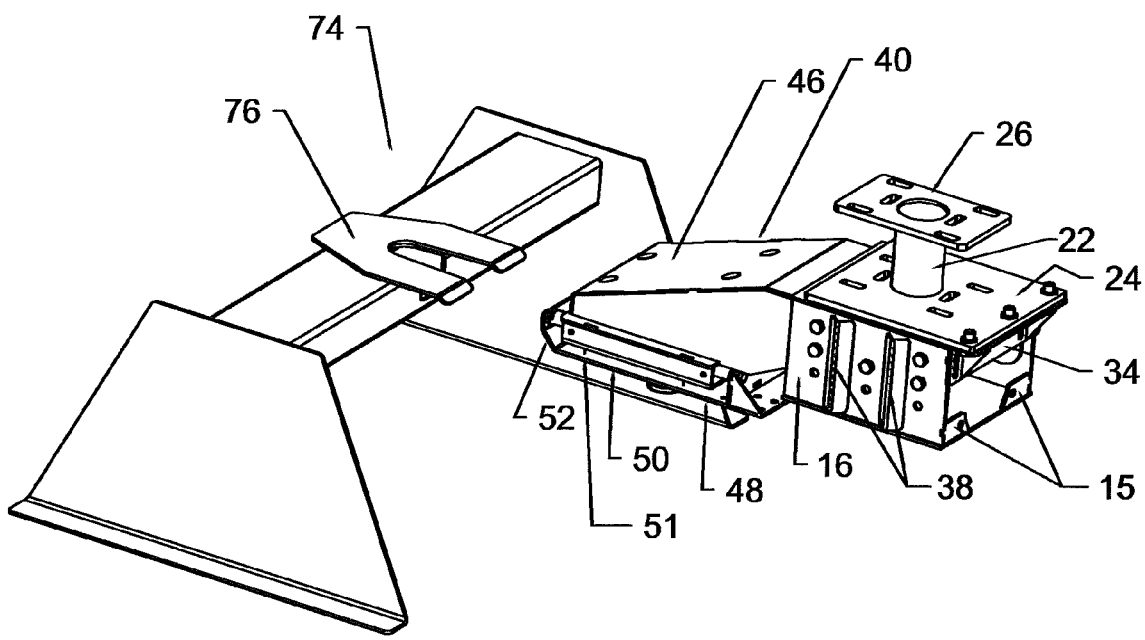
FIG. 3 is a perspective view thereof.
Figure 4:
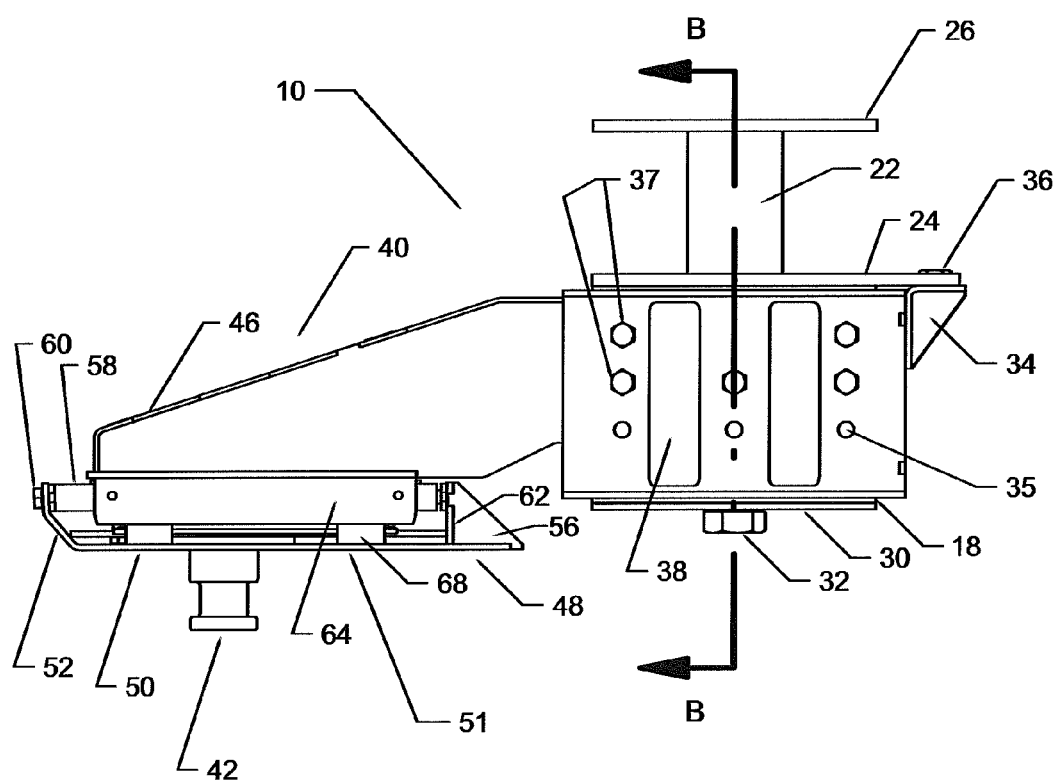
FIG. 4 is a side elevational view thereof.
Figure 5:
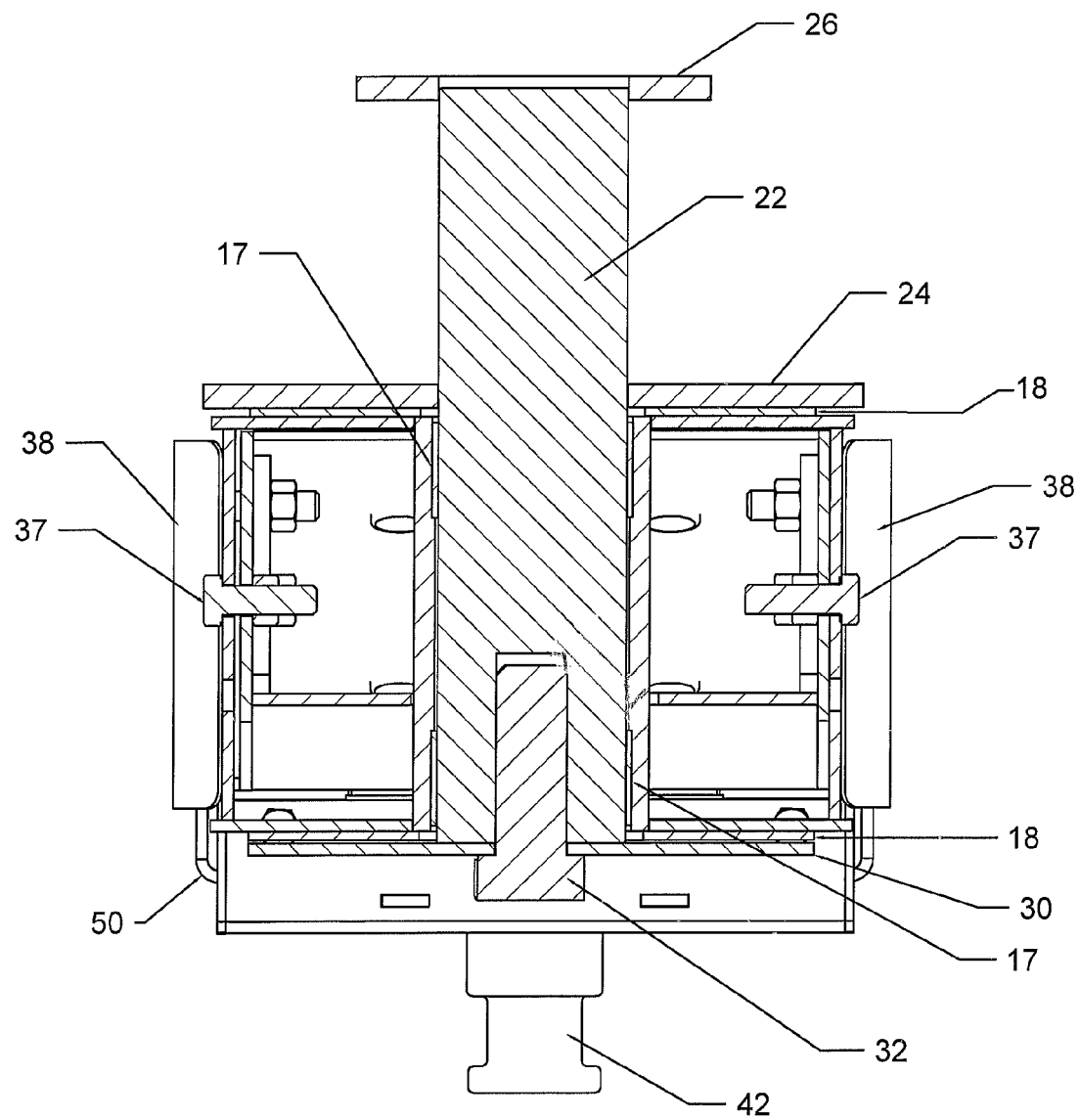
FIG. 5 is a sectional view thereof, taken along line B-B of FIG. 4.
Figure 6:
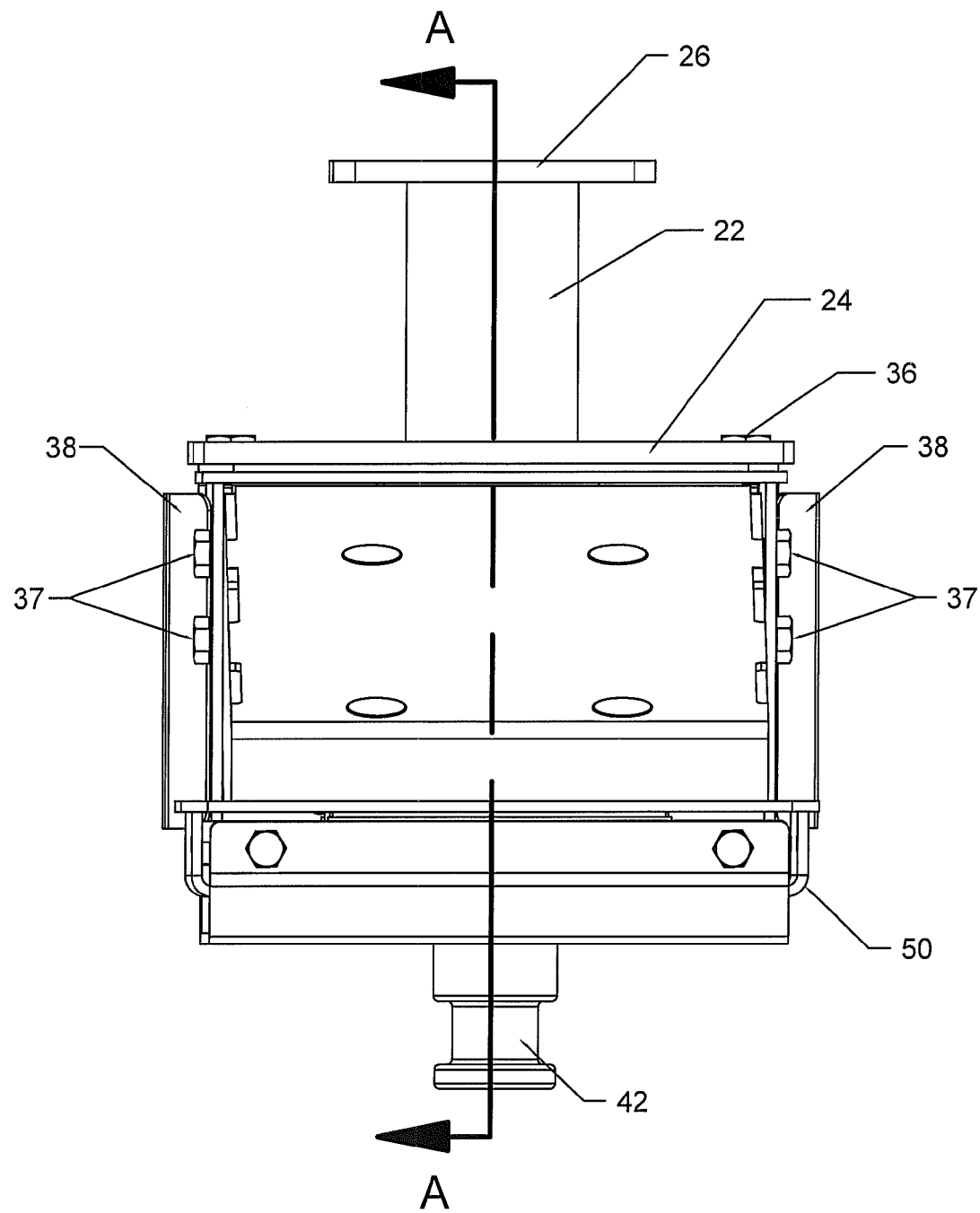
FIG. 6 is a front elevational view thereof.
Figure 7:
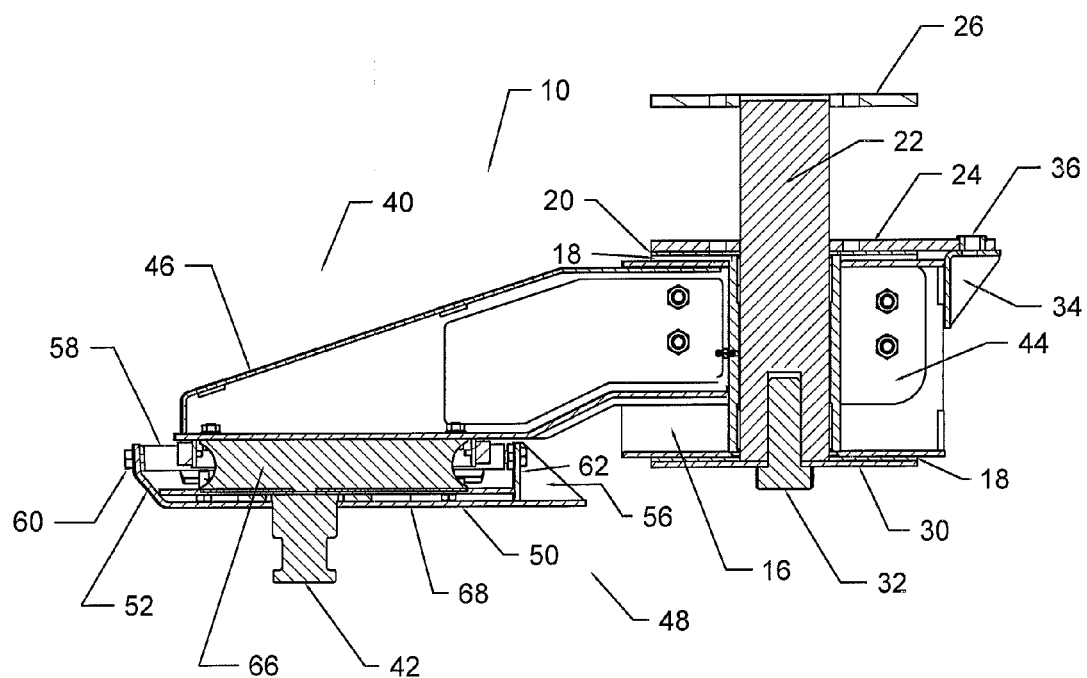
FIG. 7 is a sectional view thereof, taken along line A-A of FIG. 6.

To use the hitch coupling assembly 10 as a standard hitch coupling assembly, it should be configured as shown in FIG. 3, the brackets 24 and 26 are used to secure the hitch coupling assembly 10 within the chassis of a standard fifth wheel trailer 14. The pin box 16 and arm 40 may be attached either before or after the assembly 10 is secured to the trailer 14. The lock-out stop 34 is secured to the bottom and back of the bracket 24 through use of the fasteners 33 and attached nuts 36. As the back end of the bracket 24 extends laterally beyond the pin box 16, the lock-out stop is maintained adjacently abutted to the pin box 16. When the towing vehicle 12 is engaged in a turning maneuver, rotation of the pin box 16 and attached arm 40 will not be allowed around the journal pin 22, as the abutment of the lock-out stop 34 will force rotation of the trailer 14 forward to the axis formed around the king pin 42 within the hitch plate 76.

Figure 8:
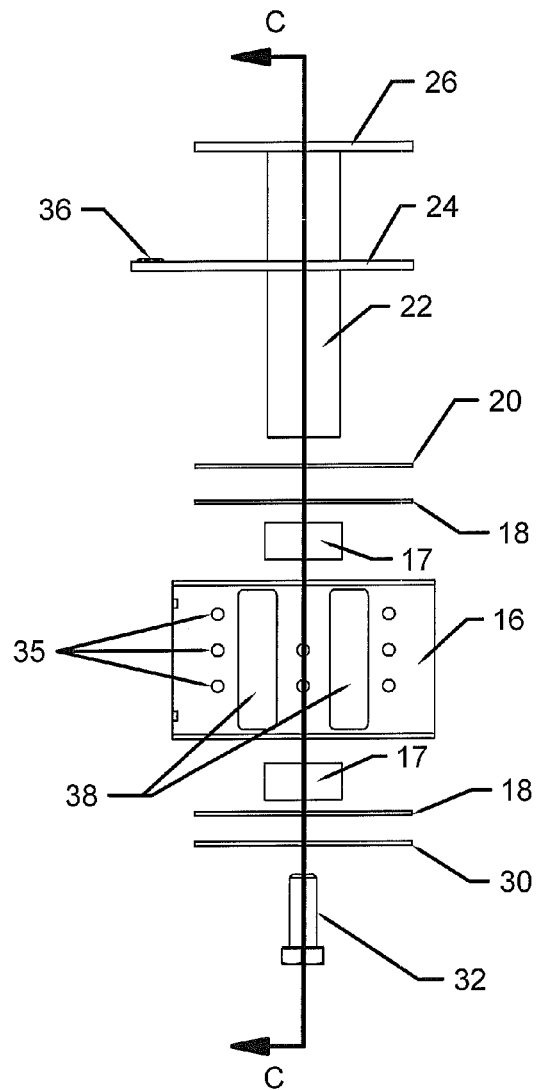
FIG. 8 is an exploded front elevational view of an embodiment of the rotational pin box only.
Figure 9:
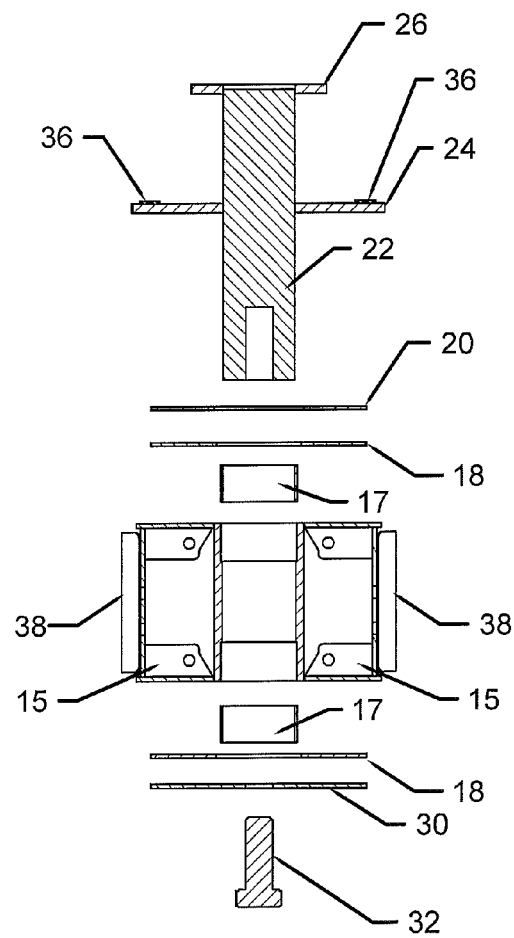
FIG. 9 is a sectional view thereof, taken along line C-C of FIG. 8.
Figure 10:
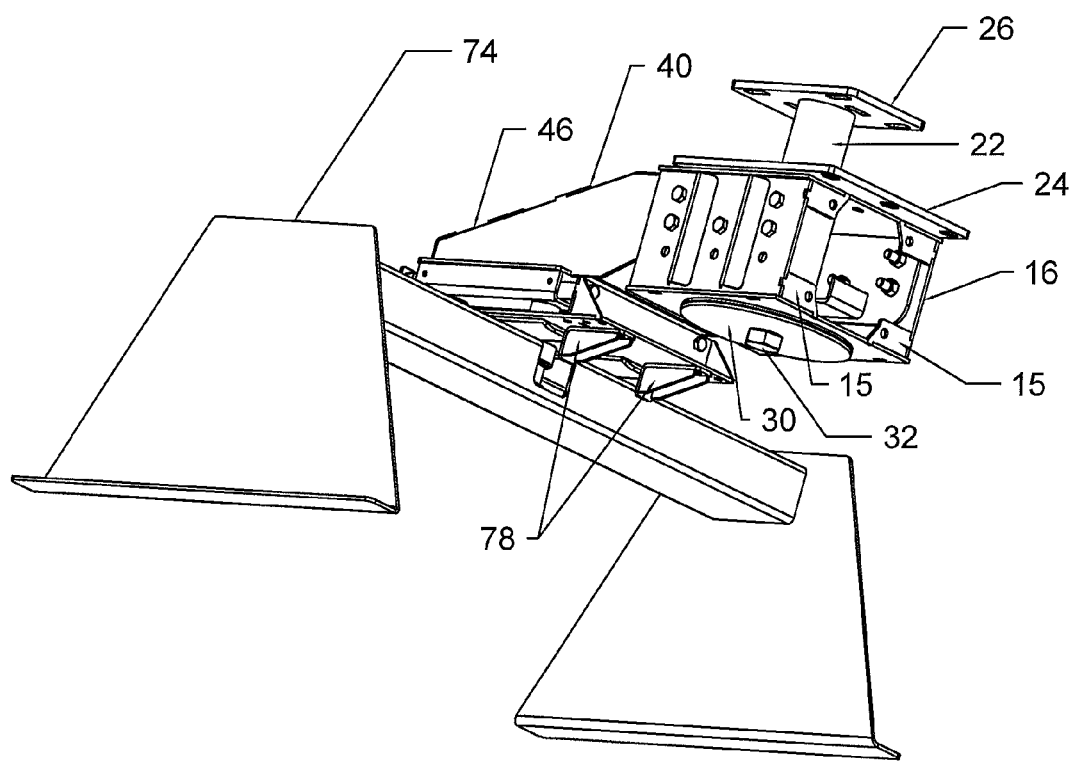
FIG. 10 is a perspective view according to another embodiment of the rotational pin box assembly.
Figure 12:
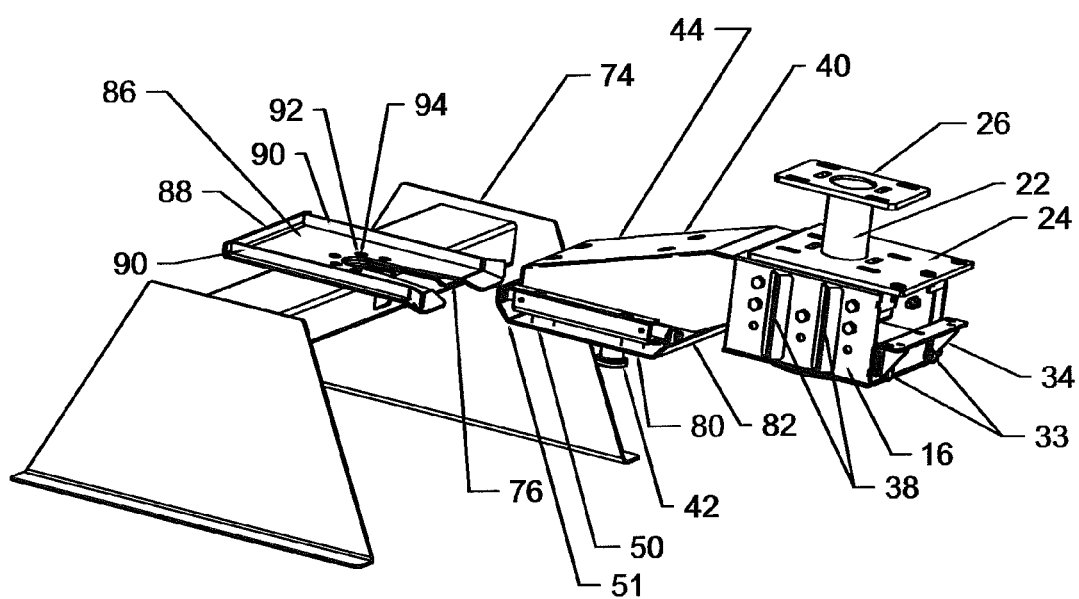
FIG. 12 is a perspective view thereof, including a stop plate mounted to a hitch.

Alternatively, the hitch coupling assembly 10 may be for short-bed towing vehicles, as shown in FIGS. 2, 10, and 12. The brackets 24 and 26 are again used to secure the hitch coupling assembly 10 within the chassis of a standard fifth wheel trailer 14. The pin box 16 and arm 40 may be attached either before or after the assembly 10 is secured to the trailer 14. The lock-out stop 34 is secured to the bottom of skid pad 50 through use of the fasteners 33 and nuts. As the hitch coupling assembly 10 is moved into position to engage the hitch plate 76 through the king pin 42, the lock-out stop 34 is maintained adjacently abutted to the hitch plate 76. When the towing vehicle 12 is engaged in a turning maneuver, rotation of the king pin 42 within the hitch plate 76 will be prevented by the abutment of the lock-out stop 34 to the hitch plate 76, and rotation of the trailer will be forced backward to an axis of rotation around the journal pin 22. In this configuration, the pin box 16 and attached arm 40 move with the towing vehicle 12, as the journal pin 22 with attached brackets 24, 26, rotate within the pin box 16. As shown in FIGS. 8 and 9, the washers 18, 20 and 18, 30 and bearings 17 provide ease of rotation as the pin box 16 rotates around the journal pin 22.

In FIG. 10, another embodiment of a hitch coupling assembly is shown. This embodiment includes alternative lock-out stop 78 secured to the skid pad 50 for maintaining adjacent abutment of the lock-out stop 78 against the hitch plate 76, for use with short-bed towing vehicles. Alternatively, when a standard hitch coupling assembly is desired, the lock-out stop 78 is secured to the bottom and back of the bracket 24. The lock-out stop 78 performs essentially the same function as the lock-out stop 34.

Figure 11:
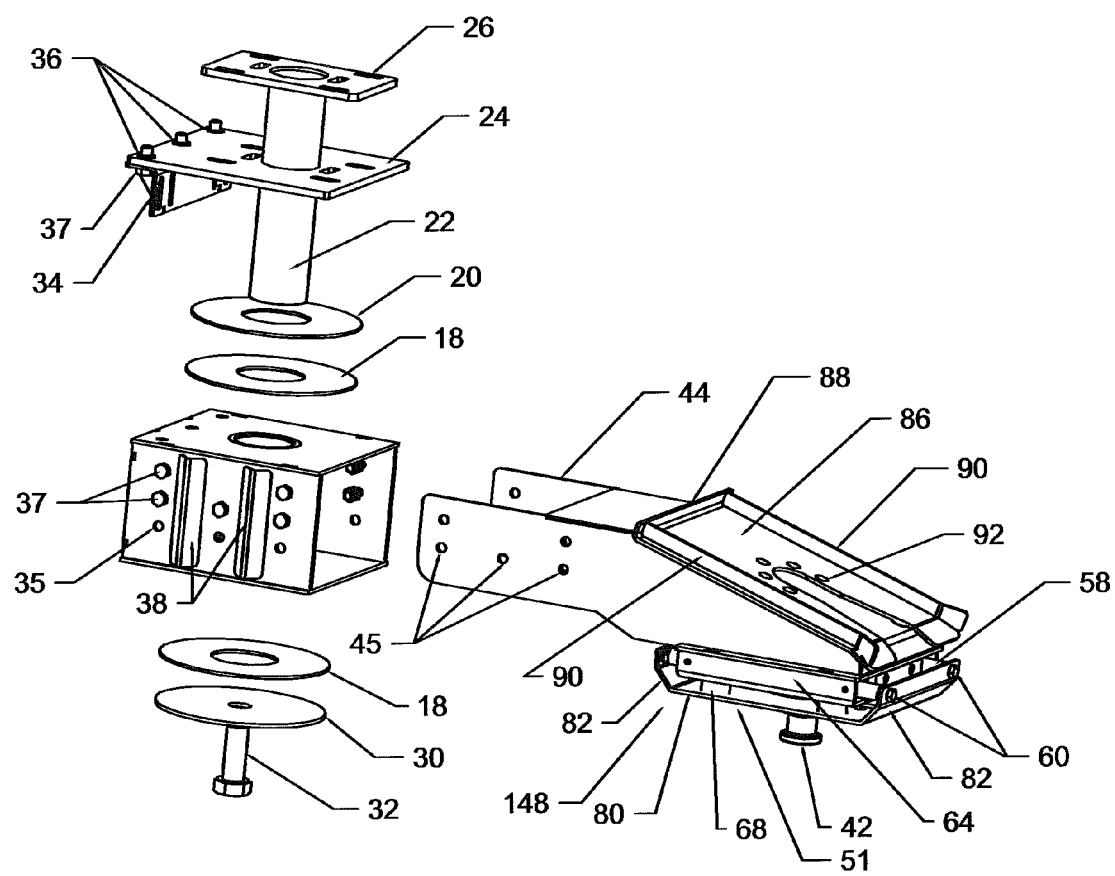
FIG. 11 is an exploded perspective view according to further embodiment of the rotational pin box assembly.
Figure 13:
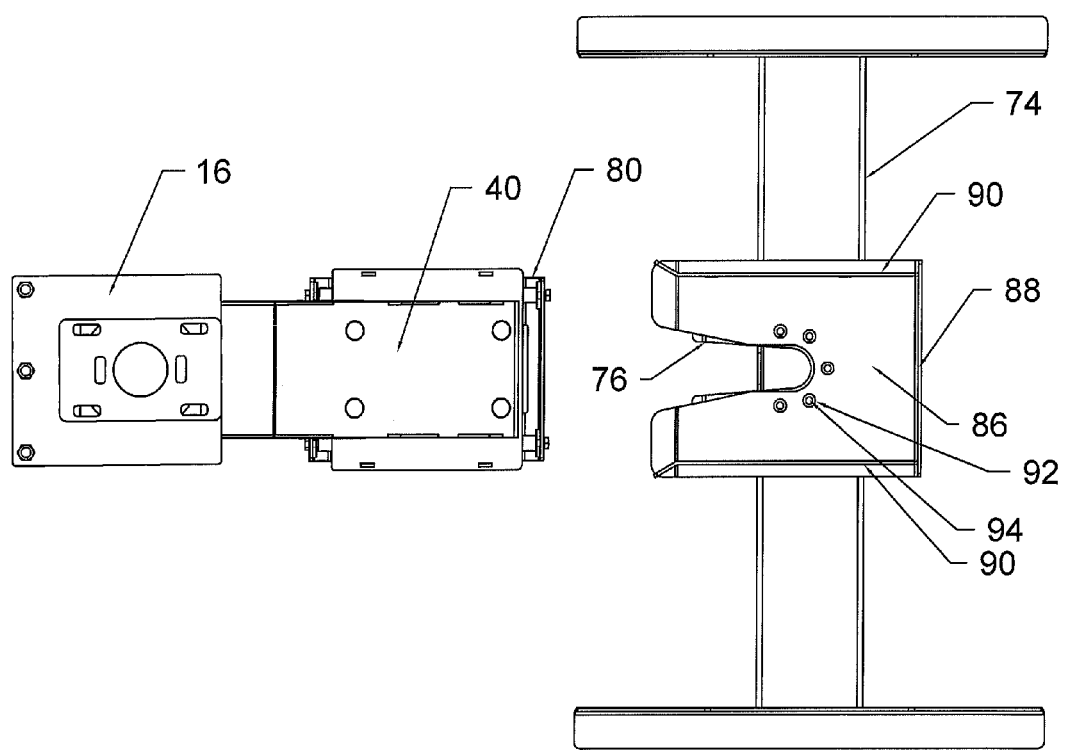
FIG. 13 is a plan view thereof.

In FIGS. 11-13, a further embodiment of a hitch coupling assembly is shown. A skid pad assembly 148 has a skid pad 80 and upturned ends 82. All other elements of assembly 148 are identical to the elements of assembly 48. The lock-out stop 34 and a hitch lock-out plate 86 are provided. The lock-out plate 86 has a back wall 88 and side walls 90 and is designed to be rigidly mounted over a hitch plate 76 using a plurality of fasteners 94 driven through holes 92 into the hitch plate 76.

Adjusting the rotational axis of the hitch coupling assembly is accomplished through movement of the hitch lock-out plate 86 and the lock-out stop 34. In a standard configuration, lock-out stop 34 is connected to the pin box 16 and bracket 24 with fasteners 36. This is shown in FIG. 11. Simultaneously, the lock out-plate 86 is in the stored position on top of the arm 44. The king pin 42 engages the trailer hitch plate 76 and the trailer 14 rotates about the axis of the king pin 42.

A short-bed towing vehicle configuration is shown in FIG. 12. The hitch lock-out plate 86 is removed from its stored position and attached by fasteners 94 to the hitch plate 76. Such a hitch plate 76 may need modification, through drilling or punching holes, to accommodate fasteners 94. The lock-out stop 34 is disconnected from the bracket 24 and moved to a stored position near the bottom of the pin box 16 where it is secured through fasteners 33 to supports 15, as shown in FIG. 12. When a towing vehicle engages in a turning maneuver in this configuration, the sides of skid pad 50 and upturned ends 82 are maintained adjacently abutted to the side walls 90 and back wall 88 of the hitch lock-out plate 86, forcing rotation of the trailer around an axis formed by the journal pin 22. It is important to remove lock-out stop 34 in this configuration, or an undesirable double lock-out situation would occur in which the trailer 14 would not be allowed any axis of rotation.

Figure 14:
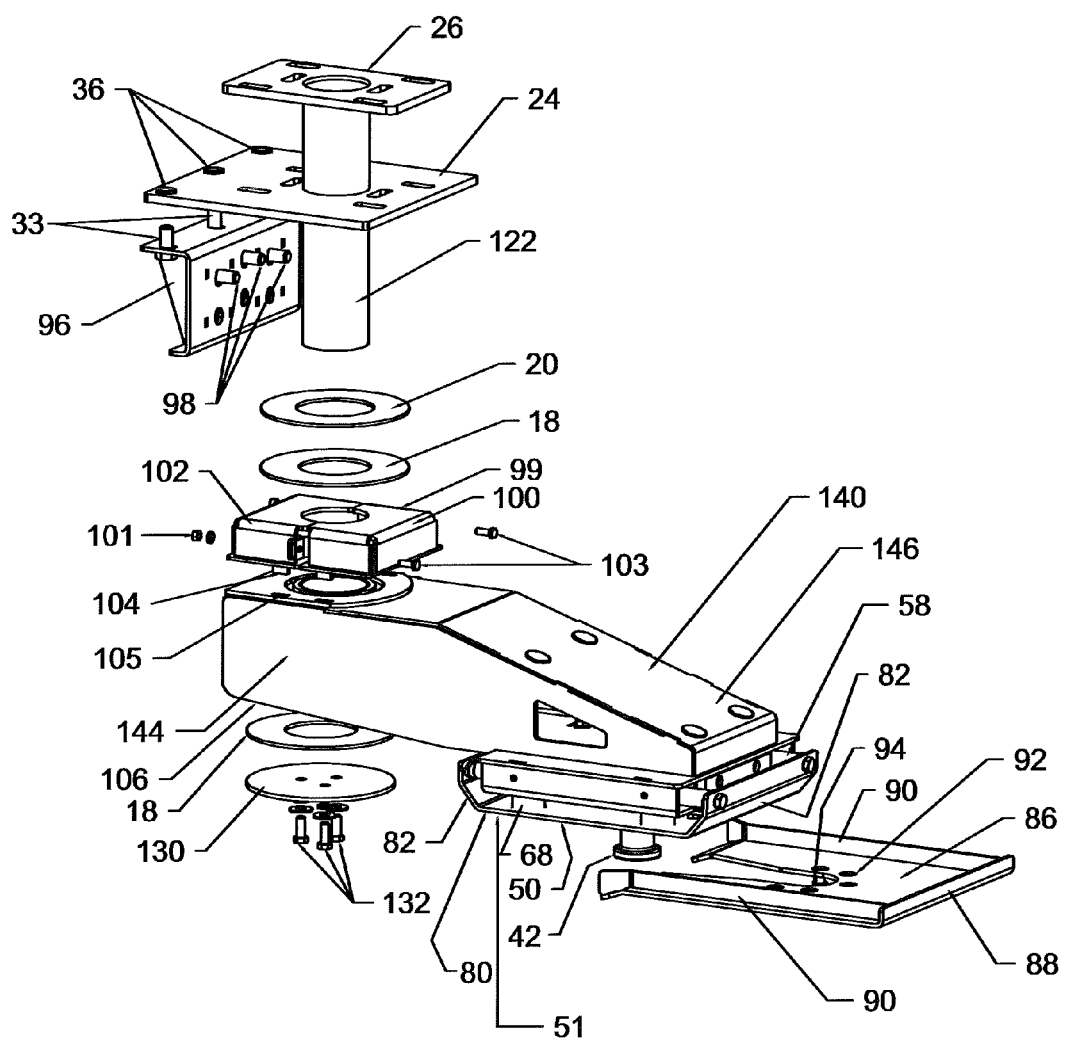
FIG. 14 is an exploded perspective view according to another embodiment of the rotational pin box assembly.

A modification of the hitch coupling assembly is shown in another embodiment in FIG. 14. This configuration includes an integrated arm 140 with attached skid pad 50. The basic operation of the configuration shown in FIG. 14 is the same as the configuration shown in FIGS. 11-13. A lock-out stop 96 is designed to attach to the bracket 24 with fasteners 33 and maintain an adjacent abutment and attachment to the integrated arm 140 with fasteners 98 in a standard towing vehicle configuration and to be removed entirely for short-bed towing purposes. A plate 130 has holes for securement of fasteners 132 to journal pin 122 for securing the journal pin 122 within the integrated arm 140. A collar 99 has two sections 100, 102 fit between the washer 18 and the top of the integrated arm 140 around the hole for the journal pin 122. The two sections 100, 102 are connected through fasteners 103 and nuts 101. A plurality of tabs 104 removably secure the collar 99 within a plurality of slots 105 formed in the integrated arm 140.

If the height of the integrated arm 140 is desired to be movable vertically so as to accommodate different heighted trailers and trailer hitches, the collar 99 may be removed through removal of fasteners 103. The sections 100, 102 are pulled away from the journal pin 122 and either placed in a position on the upperside or underside of the integrated arm 140, where a plurality of slots 106 are located to removably secure the collar in either position. It can be appreciated from this description that a variety of collars 99 may be designed with different vertical extents to accommodate a variety of height configurations for the integrated arm 140 as it is positioned relative to the trailer hitch 74.

From the above description, it will be apparent that the invention disclosed herein provides a novel and advantageous pin box assembly. The foregoing discussion discloses and describes merely exemplary methods and embodiments of the present invention. As will be understood by those familiar with the art, the invention may be embodied in other specific forms and utilize other materials without departing from the spirit or essential characteristics thereof. Accordingly, the disclosure of the present invention is intended to be illustrative, but not limiting, of the scope of the invention, which is set forth in the following claims.

What is claimed is:

1. In combination a hitch coupling assembly attaching a trailer to a towing vehicle comprising:
    said towing vehicle including a hitch plate having an upper surface and an open end for receiving a king pin;
    an arm having opposite ends;
    a skid plate attached to one end of said arm, said skid plate having a perimeter defined by sides and having said king pin extending from a surface thereof, said surface of said skid plate supported above said upper surface of said hitch plate and said king pin being retained in said open end of said hitch plate;
    a journal pin attached to the opposite end of said arm and being rotatable relative to said arm, said journal pin being rotatably fixed to said trailer; and
    said arm being selectively lockable relative to said hitch plate while leaving said journal pin rotatable relative to said arm, and said journal pin being selectively lockable relative to said arm while leaving said arm pivotable relative to said hitch plate about said king pin.

2. A combination as claimed in claim 1, wherein a locking plate secured to said hitch plate, said locking plate having side walls extending upward, said skid plate overlying said locking plate so that said walls restrictively abut said sides of said skid plate.

3. A combination as claimed in claim 1, wherein a stop is secured to said skid plate so that when said king pin is received in said open end of said hitch, said stop will abut said hitch plate, thereby preventing rotation of said arm relative to said hitch.

4. A combination as claimed in claim 1, wherein said journal pin includes a bracket rotationally fixed with respect to said journal pin, said bracket having holes for receiving fasteners, said fasteners extending through said holes in said bracket and received in said arm to prevent rotation of said journal pin with respect to said arm.

5. A combination as claimed in claim 4, wherein said journal pin includes a bracket connected to said journal pin, said bracket having a stop removably secured to said bracket, said stop abutting said arm to prevent rotation of said journal pin with respect to said arm.

6. A combination as claimed in claim 1, including a movable lock-out stop that may be selectively moved to lock said journal pin relative to said arm or to lock said arm relative to said hitch plate.

7. A combination as claimed in claim 6, wherein said journal pin includes a bracket rotationally fixed with respect to said journal pin, said bracket having holes for receiving fasteners, said fasteners extending through said holes in said bracket and received in said arm to prevent rotation of said journal with respect to said arm.

8. A combination as claimed in claim 1, including a lock-out plate affixable to said hitch plate, said lock-out plate restraining said arm from rotating about said hitch plate.

9. A combination as claimed in claim 8, wherein said lock-out plate has an upturned wall restraining said arm from rotating about said hitch plate.

10. A combination as claimed in claim 9, wherein said lock-out plate is secured to said hitch plate with bolts.

* * * * *